(12) United States Patent
Weldon

(10) Patent No.: US 11,724,726 B2
(45) Date of Patent: Aug. 15, 2023

(54) DISH CARRYING ASSEMBLY

(71) Applicant: Ivan Weldon, Kansas City, MO (US)

(72) Inventor: Ivan Weldon, Kansas City, MO (US)

( * ) Notice: Subject to any disclaimer, the term of this patent is extended or adjusted under 35 U.S.C. 154(b) by 0 days.

(21) Appl. No.: 17/540,735

(22) Filed: Dec. 2, 2021

(65) Prior Publication Data
US 2023/0174127 A1 Jun. 8, 2023

(51) Int. Cl.
*A47B 31/00* (2006.01)
*B62B 3/10* (2006.01)
*B62B 3/00* (2006.01)

(52) U.S. Cl.
CPC .............. *B62B 3/006* (2013.01); *A47B 31/00* (2013.01); *B62B 3/108* (2013.01); *A47B 2031/002* (2013.01)

(58) Field of Classification Search
CPC ........... B62B 3/006; B62B 3/10; B62B 3/004; B62B 3/108; B62B 3/005; B62B 2202/67; B62B 5/063; B62B 5/06; A47B 31/00; A47B 2031/002; A47B 2031/104; A47B 2031/007; A47B 81/04
See application file for complete search history.

(56) References Cited

U.S. PATENT DOCUMENTS

| | | | |
|---|---|---|---|
| 2,944,672 A | 7/1960 | Simpson | |
| 3,053,600 A * | 9/1962 | Holloway | A47J 39/025 312/236 |
| 3,058,331 A * | 10/1962 | Madonna | D06F 37/10 220/213 |
| 3,190,453 A * | 6/1965 | Shelley | B65G 1/07 219/214 |
| 3,327,655 A * | 6/1967 | Mackay | B65G 1/07 211/59.3 |
| 3,357,760 A * | 12/1967 | Shelley, Jr. | B65G 1/07 312/71 |
| 3,531,169 A | 9/1970 | Hoffmann | |
| 3,834,725 A * | 9/1974 | Luoni | A47B 31/00 312/305 |
| 3,887,253 A * | 6/1975 | Bridges | A47B 31/00 312/249.8 |
| 4,108,518 A * | 8/1978 | Angst | B65G 1/07 312/305 |
| 4,241,930 A * | 12/1980 | Bell | B62B 1/10 280/47.29 |

(Continued)

FOREIGN PATENT DOCUMENTS

| | | | | |
|---|---|---|---|---|
| CH | 706328 A2 * | 9/2013 | ............ | B62B 3/104 |
| CN | 105361472 A * | 3/2016 | | |

(Continued)

*Primary Examiner* — Steve Clemmons

(57) ABSTRACT

A dish carrying assembly for collecting and transporting entree dishes includes a cart that has a plurality of rollers for rolling on a support surface. A canister is coupled to the cart has the canister extending upwardly from the cart and the canister has an entry to facilitate entrée dishes to be positioned within the canister. A lifting unit is integrated into the canister and the entree dishes can be stacked upon the lifting unit. The lifting unit is biased to travel upwardly in the canister thereby facilitating a user to remove a respective entree dish from the canister without having to bend over. A door is slidably disposed on the canister for opening and closing the canister.

10 Claims, 7 Drawing Sheets

(56) References Cited

U.S. PATENT DOCUMENTS

| | | | | |
|---|---|---|---|---|
| 4,529,093 A | * | 7/1985 | Ruiz | B65G 1/07 |
| | | | | 211/59.3 |
| 4,799,606 A | * | 1/1989 | Vershbow | B65G 1/07 |
| | | | | 221/280 |
| 5,199,600 A | * | 4/1993 | Fietsam | B65G 1/07 |
| | | | | 221/244 |
| 5,330,060 A | * | 7/1994 | Bohner | A47B 31/00 |
| | | | | 211/85.8 |
| 6,027,128 A | * | 2/2000 | Stich | B60B 33/0002 |
| | | | | 280/47.35 |
| 6,106,084 A | * | 8/2000 | Thogersen | A47B 31/06 |
| | | | | 312/310 |
| 8,596,654 B2 | | 12/2013 | Belanger | |
| 9,126,613 B2 | | 9/2015 | Savage | |
| 9,643,639 B1 | * | 5/2017 | Rene | B62B 5/02 |
| 10,806,283 B2 | * | 10/2020 | Aguirre | A47F 7/0057 |
| 11,198,461 B2 | * | 12/2021 | Lee | B62B 3/006 |
| 11,297,982 B2 | * | 4/2022 | Allen | A47J 47/14 |
| 11,540,627 B2 | * | 1/2023 | Jung | E05F 15/608 |
| 2011/0133616 A1 | | 6/2011 | Qin | |
| 2020/0122836 A1 | * | 4/2020 | Carmona-Puga | B64D 11/04 |

FOREIGN PATENT DOCUMENTS

| | | | | |
|---|---|---|---|---|
| CN | 109043832 A | * | 12/2018 | |
| CN | 115009702 A | * | 9/2022 | |
| DE | 202007015293 U1 | * | 1/2008 | A47B 49/00 |
| KR | 200485191 Y1 | * | 12/2017 | |
| KR | 20190111306 A | * | 10/2019 | |

\* cited by examiner

DISH CARRYING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to carrying device and more particularly pertains to a new carrying device for collecting and transporting a plurality of entree dishes. The device includes a cart and a canister that extends upwardly from the cart. The canister has an entry for receiving entree dishes and a lifting unit that is integrated into the canister. The lifting unit lifts the entrée dishes upwardly in the canister to facilitate the entrée dishes to be placed into or removed from the canister without requiring a user to bend over.

(2) Description of Related Art Including Information Disclosed Under 37 CFR 1.97 and 1.98

The prior art relates to carrying devices including a self leveling cart that includes a lifting unit and a series of gears and a chain for adjusting a height of the lifting unit. The prior art discloses a food service cart that includes a plurality of pivotable shelf units for supporting a plurality of trays. The prior art discloses a food service that includes a pair of collection bays, each having slots for supporting food service trays, and a pair of lifting units each being disposed in a respective collection bay. The prior art discloses a food service cart that has a narrow profile to facilitate the food service cart to be transported down a narrow aisle.

BRIEF SUMMARY OF THE INVENTION

An embodiment of the disclosure meets the needs presented above by generally comprising a cart that has a plurality of rollers for rolling on a support surface. A canister is coupled to the cart has the canister extending upwardly from the cart and the canister has an entry to facilitate entree dishes to be positioned within the canister. A lifting unit is integrated into the canister and the entree dishes can be stacked upon the lifting unit. The lifting unit is biased to travel upwardly in the canister thereby facilitating a user to remove a respective entree dish from the canister without having to bend over. A door is slidably disposed on the canister for opening and closing the canister.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
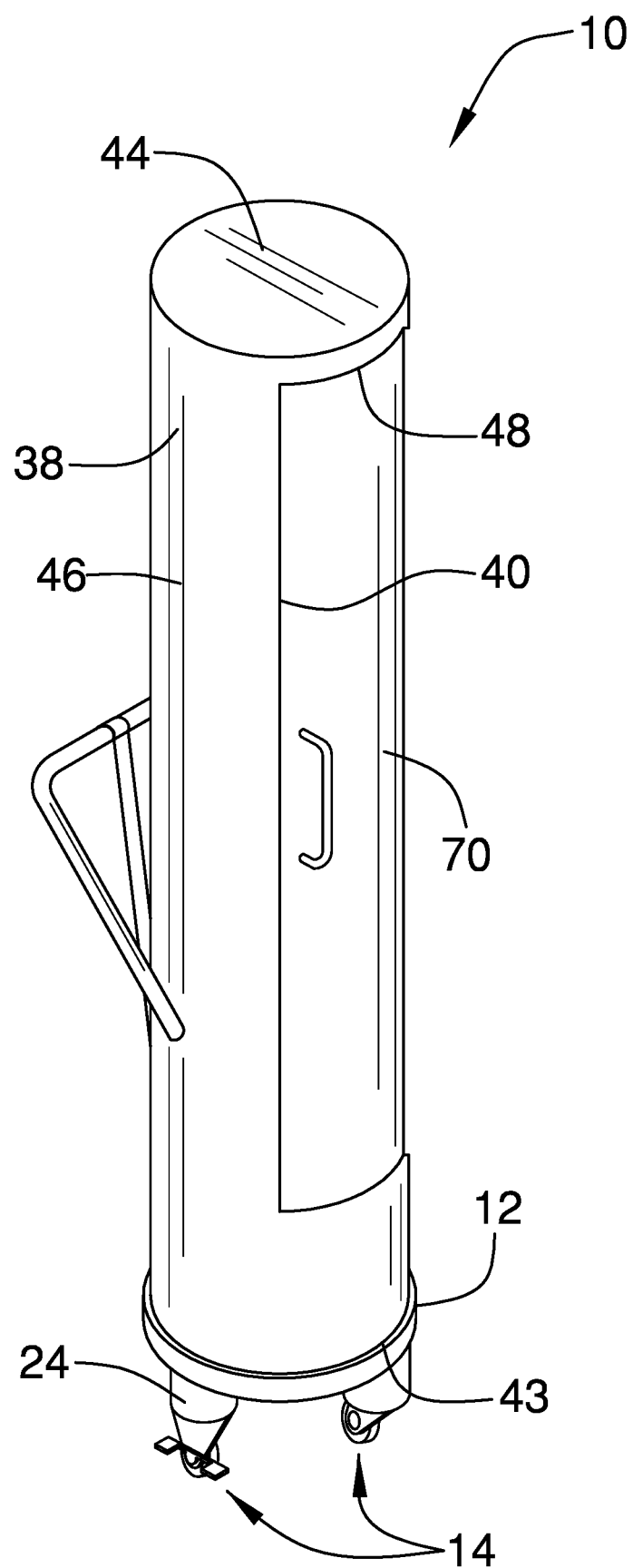
FIG. 1 is a front perspective view of a dish carrying assembly according to an embodiment of the disclosure.
Figure 2:
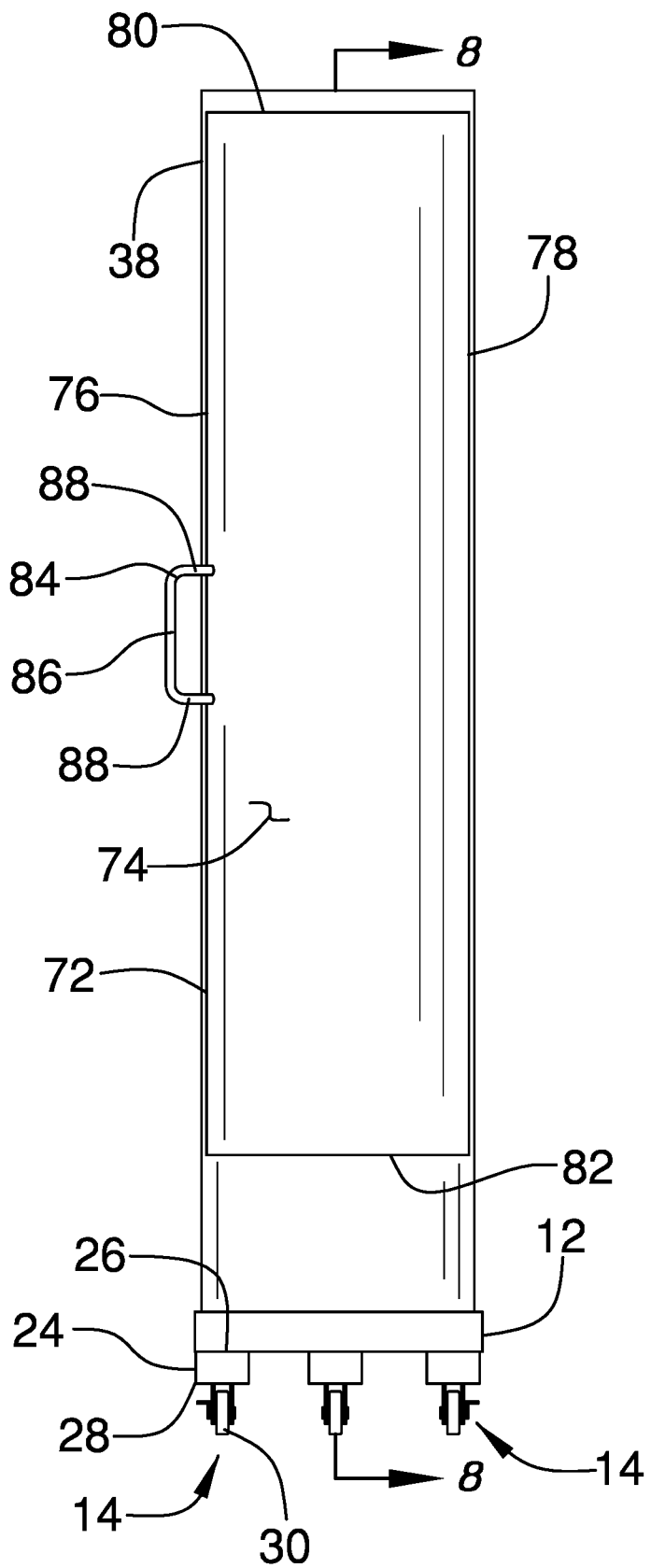
FIG. 2 is a front view of an embodiment of the disclosure showing a door in a closed position.
Figure 3:
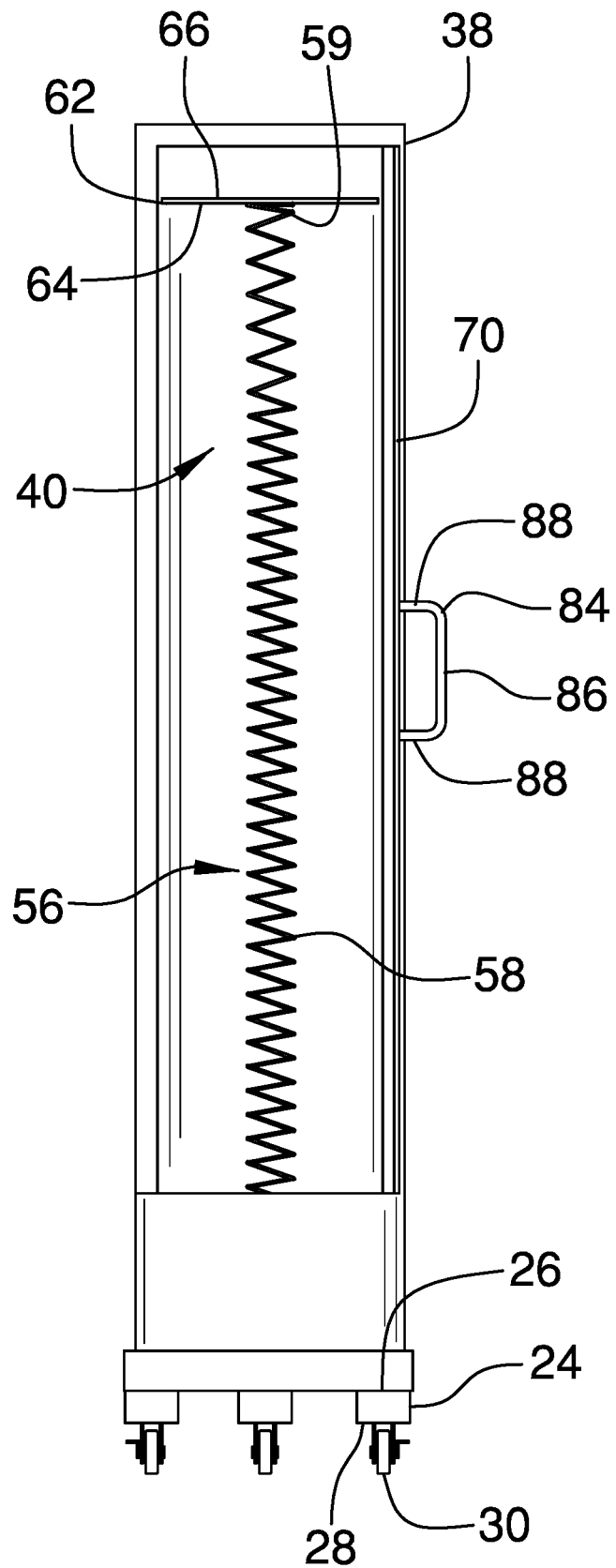
FIG. 3 is a front view of an embodiment of the disclosure showing a door in an open position.
Figure 4:
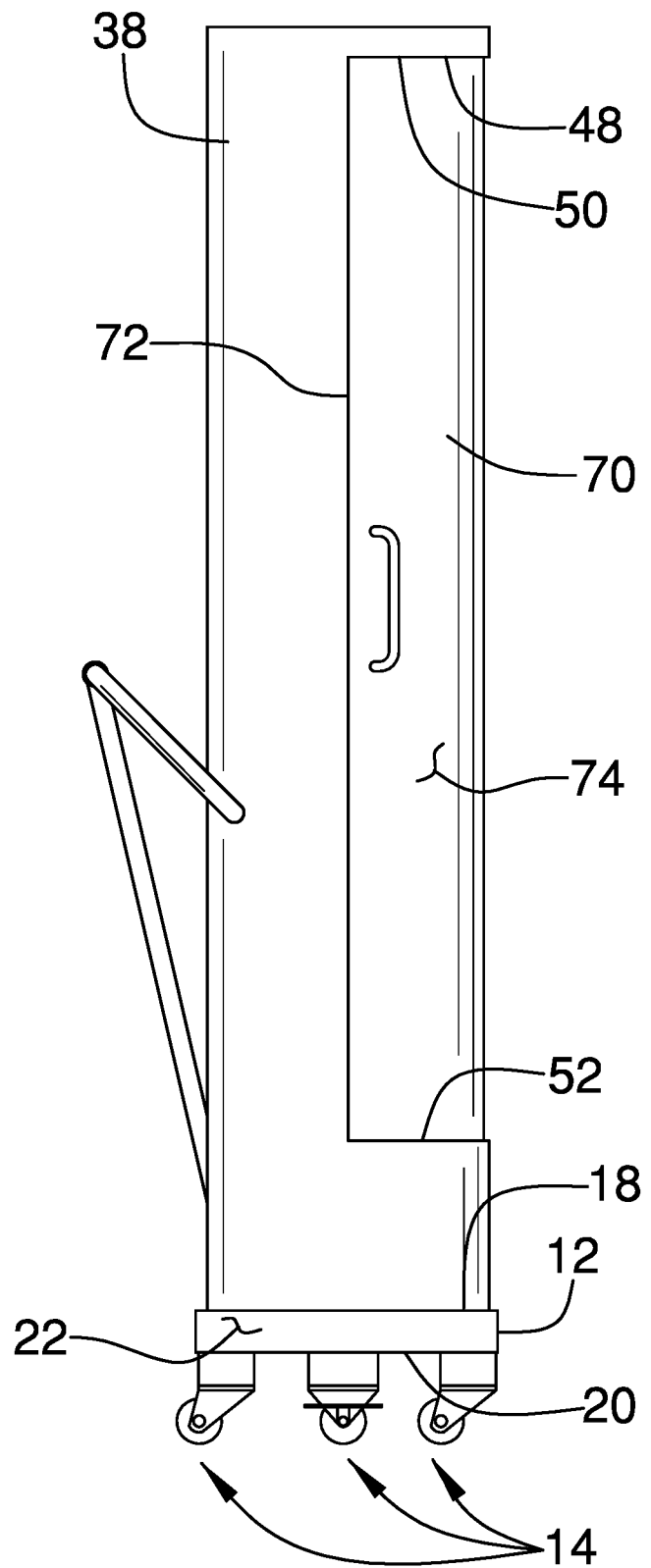
FIG. 4 is a right side view of an embodiment of the disclosure.
Figure 5:
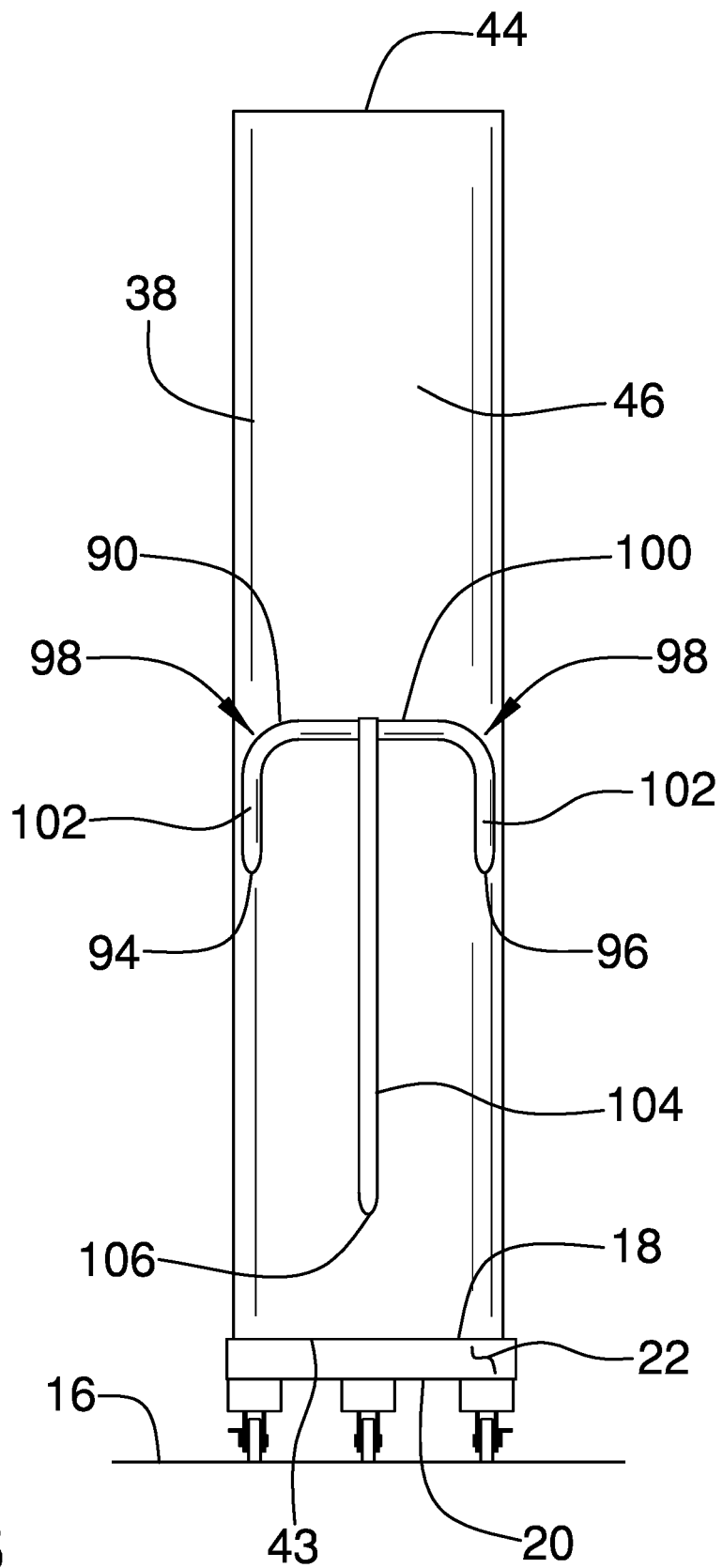
FIG. 5 is a back view of an embodiment of the disclosure.
Figure 6:
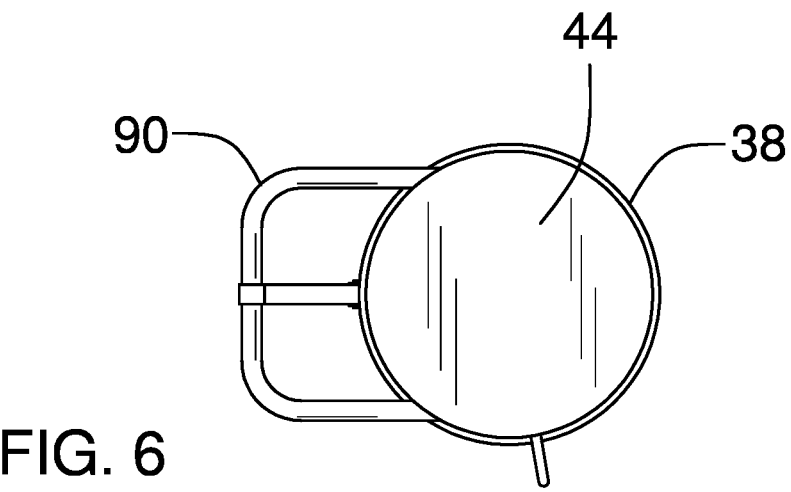
FIG. 6 is a top view of an embodiment of the disclosure.
Figure 7:
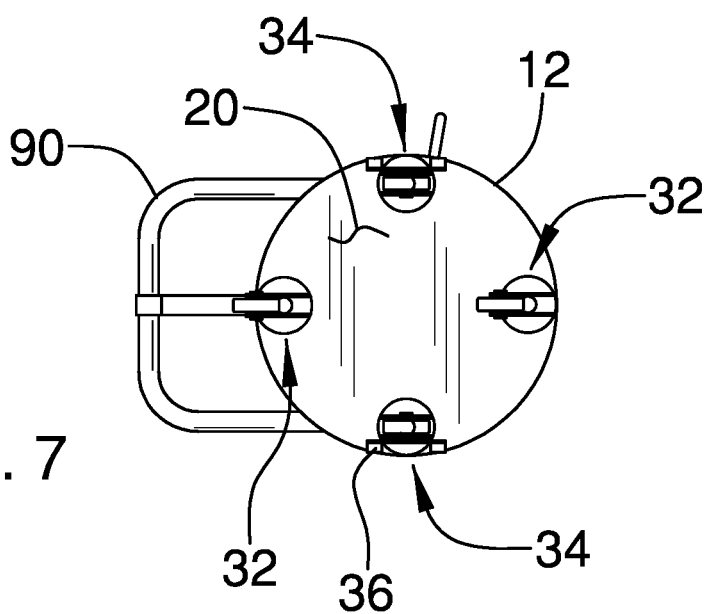
FIG. 7 is a bottom view of an embodiment of the disclosure.
Figure 8:
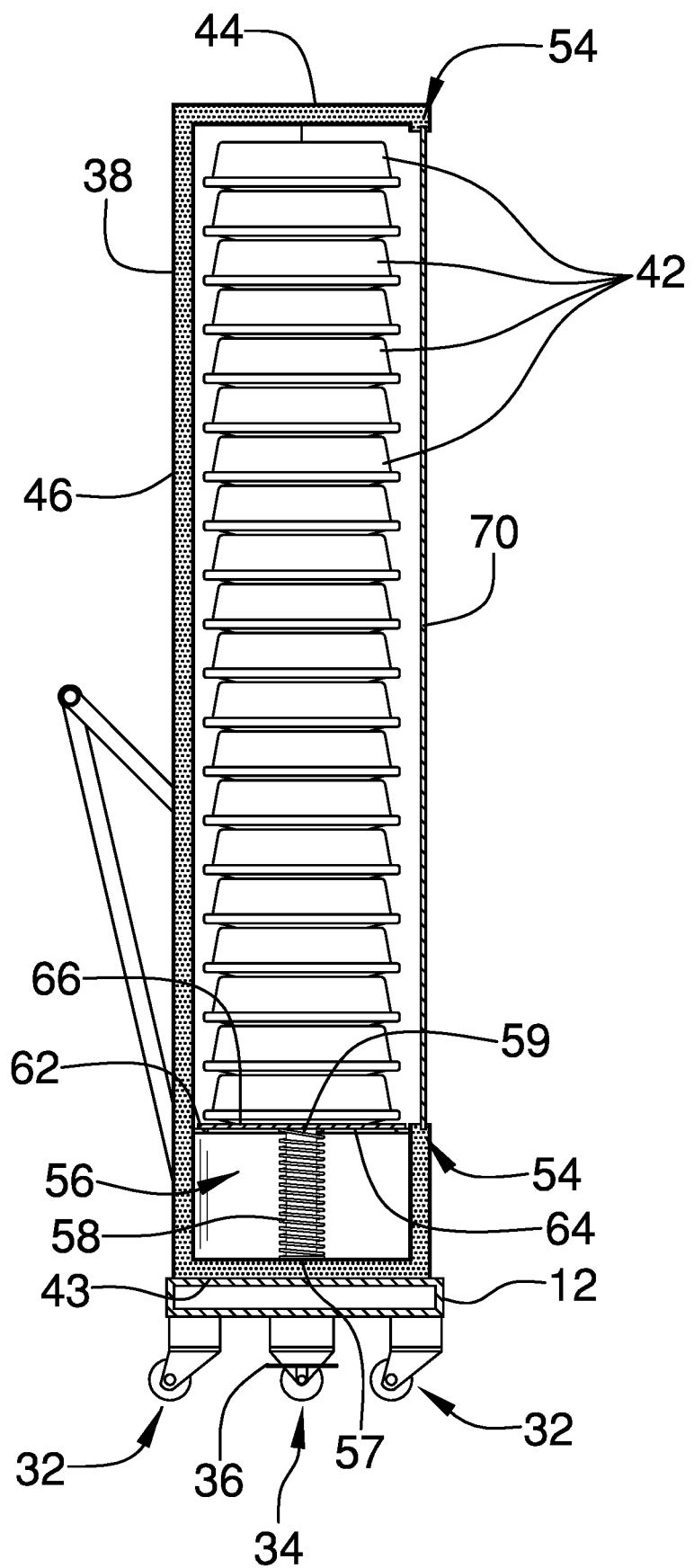
FIG. 8 is a cross sectional view taken along line 8-8 of FIG. 2 of an embodiment of the disclosure.

With reference now to the drawings, and in particular to FIGS. 1 through 8 thereof, a new carrying device embodying the principles and concepts of an embodiment of the disclosure and generally designated by the reference numeral 10 will be described.

As best illustrated in FIGS. 1 through 8, the dish carrying assembly 10 generally comprises a cart 12 that has a plurality of rollers 14 each being rotatably coupled to the cart 12 such that the plurality of rollers 14 can be rolled on a support surface 16. The cart 12 has a top surface 18, a bottom surface 20 and a perimeter surface 22 extending between the top surface 18 and the bottom surface 20. The perimeter surface 22 is continuously arcuate such that the cart 12 has a disk shape. Each of the rollers 14 comprises a shock absorber 24 that has an upper end 26 and a lower end 28, and the upper end 26 is coupled to the bottom surface 20 of the cart 12. Furthermore, the shock absorber 24 is compressible between the upper end 26 and the lower end 28. The shock absorber 24 associated with each of the rollers 14 may comprise a gas charged cylinder, a spring or any other type of resiliently compressible member.

Each of the rollers 14 includes a wheel 30 that is rotatably disposed on the lower end 28 of the shock absorber 24 thereby facilitating the wheel 30 to roll along the support surface 16. The plurality of rollers 14 includes a set of swiveling rollers 32 and a set of locking rollers 34. Each of the swiveling rollers 32 is rotatable about an axis extending between said upper end 26 said lower end 28 of said shock absorber 24. Each of the locking rollers 34 is fixed to the cart 12 such that the locking rollers 34 are inhibited from swiveling. Additionally, each of the locking rollers 34 includes a wheel lock 36 that is urgeable between a locked position and an unlocked position. The wheel 30 associated with the locking rollers 34 is inhibited from rolling when the wheel lock 36 is in the locked position and the wheel 30 associated with the locking rollers 34 is facilitated to roll when the wheel lock 36 is in the unlocked position.

A canister 38 is coupled to the cart 12 having the canister 38 extending upwardly from the cart 12. The canister 38 has an entry 40 extending into an interior of the canister 38 to facilitate entrée dishes 42 to be positioned within the canister 38 for transporting the entrée dishes 42. The entree dishes 42 may be dishes that are employed in a restaurant or other type of location that serves food to a multitude of people. The canister 38 has a bottom end 43, a top end 44 and an outer wall 46 extending between the top end 44 and the bottom end 43, and the bottom end 43 rests on the top surface 18 of the cart 12.

The canister 38 is elongated between the top end 44 and the bottom end 43 to a height ranging between approximately 6.0 feet and 8.0 feet and the canister 38 has a diameter ranging between approximately 14.0 inches and 16.0 inches. The entry 40 extends through the outer wall 46, the entry 40 is elongated to extend substantially between the top end 44 and the bottom end 43, and the entry 40 is positioned closer to the top end 44 than the bottom end 43. The entry 40 has a bounding edge 48, and the bounding edge 48 has an upper side 50 and a lower side 52. A pair of tracks 54 is each integrated into the outer wall 46 of the canister 38. Each of the tracks 54 is aligned with a respective one of the upper side 50 and the lower side 52 of the bounding edge 48 of the entry 40.

A lifting unit 56 is integrated into the canister 38 and the entree dishes 42 are stackable upon the lifting unit 56. The lifting unit 56 is biased to travel upwardly in the canister 38 to lift the entree dishes 42 upwardly thereby facilitating a user to remove a respective entree dish from the canister 38 without having to bend over. The lifting unit 56 comprises a biasing member 58 that has a lower end 57 and an upper end 59. The lower end 57 of the biasing member 58 is coupled to a top surface 60 of the bottom end 43 of the canister 38 and the biasing member 58 is biased to elongate such that the upper end 26 travels toward the top end 44 of the canister 38.

The lifting unit 56 includes a plate 62 that has a lower surface 64 and an upper surface 66. The lower surface 64 is coupled to the upper end 59 of the biasing member 58 and the entree dishes 42 are stacked on the upper surface 66. The biasing member 58 has a compressive strength that is directly proportional to the number of entree dishes 42 that is positioned on the plate 62. In this way the biasing member 58 can position a topmost one 68 of the entree dishes 42 adjacent to the top end 44 of the canister 38 regardless of the number of entree dishes 42 stacked on the plate 62.

A door 70 is provided and the door 70 is slidably disposed on the canister 38. The door 70 is slidable into a closed position having the door 70 closing the entry 40 and the door 70 is slidable into an open position having the door 70 exposing the entry 40. The door 70 has an outer edge 72 and a front surface 74, and the outer edge 72 has a first lateral side 76, a second lateral side 78, a top side 80 and a bottom side 82. The front surface 74 is convexly arcuate between the first lateral side 76 and the second lateral side 78 such that the door 70 conforms to curvature of the outer wall 46 of the canister 38. The top side 80 slidably engages the track 54 that is aligned with the upper side 50 of the bounding edge 48 of the entry 40 and the bottom side 82 slidably engages the track 54 that is aligned with the lower side 52 of the bounding edge 48 of the entry 40.

A grip 84 is provided and the grip 84 is coupled to the door 70 such that the grip 84 can be gripped. The grip 84 has a central member 86 extending between a pair of outward members 88. Each of the outward members 88 is spaced apart from each other and is oriented perpendicular with the central member 86. Furthermore, each of the outward members 88 is coupled to the front surface 74 of the door 70 having the central member 86 being spaced from the front surface 74.

A handle 90 is coupled to the canister 38 and the handle 90 can be gripped for pushing the canister 38 along the support surface 16. The handle 90 comprises a first member 92 that has a first end 94 and a second end 96, and the first member 92 has a pair of bends 98 each integrated into the handle 90 to define a central portion 100 forming an angle with a pair of outward portions 102. Each of the first end 94 and the second end 96 is associated with a respective one of the outward portions 102. Each of the first end 94 and the second end 96 is coupled to the outer wall 46 of the canister 38 and each of the outward portions 102 is oriented to angle upwardly on the canister 38 having the central portion 100 being horizontally oriented. The handle 90 includes a second member 104 that is coupled to and extends downwardly from the central portion 100. Additionally, the second member 104 has a distal end 106 with respect to the central portion 100 and the distal end 106 is coupled to the outer wall 46.

In use, dirty entrée dishes 42 are stacked on the lifting unit 56 while the dirty entrée dishes 42 are being collected from dinner tables or clean entrée dishes 42 are stacked on the lifting unit 56 when the clean entrée dishes 42 are to be distribute to dinner tables. In this way a single individual can transport a large number of the entree dishes 42 without assistance. Additionally, the lifting unit 56 facilitates each of the entree dishes 42 to be removed from the canister 38 without requiring the individual to bend over to grab each entree dish 42. In this way the individual can efficiently collect the dirty entree dishes 42 or distribute the clean entree dishes 42 with minimal effort. Additionally, a catering company can reduce operating expenses by facilitating a single employee to safely perform the work or two or more employees.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dish carrying assembly for carrying a plurality of entrée plates in a vertical stack, said assembly comprising:
   a cart having a plurality of rollers each being rotatably coupled to said cart wherein said plurality of rollers is configured to be rolled on a support surface;
   a canister being coupled to said cart having said canister extending upwardly from said cart, said canister having an entry extending into an interior of said canister wherein said entry is configured to facilitate entrée dishes to be positioned within said canister for transporting the entrée dishes;
   a lifting unit being integrated into said canister wherein said lifting unit is configured to have the entrée dishes being stacked upon said lifting unit, said lifting unit being biased to travel upwardly in said canister wherein said lifting unit is configured to lift the entrée dishes upwardly thereby facilitating a user to remove a respective entrée dish from said canister without having to bend over;
   a door being slidably disposed on said canister, said door being slidable into a closed position having said door closing said entry, said door being slidable into an open position having said door exposing said entry;
   a grip being coupled to said door wherein said grip is configured to be gripped;
   a handle being coupled to said canister wherein said handle is configured to be gripped for pushing said canister along the support surface;
   wherein said cart has a top surface, a bottom surface and a perimeter surface extending between said top surface and said bottom surface, said perimeter surface being continuously arcuate such that said cart has a disk shape; and
   wherein each of said rollers comprises:
      a shock absorber having an upper end and a lower end, said upper end being coupled to said bottom surface of said cart, said shock absorber being compressible between said upper end and said lower end; and
      a wheel being rotatably disposed on said lower end of said shock absorber wherein said wheel is configured to roll along the support surface.

2. The assembly according to claim 1, wherein said canister has a bottom end, a top end and an outer wall extending between said top end and said bottom end, said bottom end resting on said top surface of said cart, said canister being elongated between said top end and said bottom end, said entry extending through said outer wall, said entry being elongated to extend substantially between said top end and said bottom end, said entry being positioned closer to said top end than said bottom end, said entry having a bounding edge, said bounding edge having an upper side and a lower side.

3. The assembly according to claim 2, further comprising a pair of tracks, each of said tracks being integrated into said outer wall of said canister, each of said tracks being aligned with a respective one of said upper side and said lower side of said bounding edge of said entry.

4. The assembly according to claim 3, wherein said door has an outer edge and a front surface, said outer edge having a first lateral side, a second lateral side, a top side and a bottom side, said front surface being convexly arcuate between said first lateral edge and said second lateral edge such that said door conforms to curvature of said outer wall of said canister, top side slidably engaging said track being aligned with said upper side of said bounding edge of said entry, said bottom side slidably engaging said track being aligned with said lower side of said bounding edge of said entry.

5. The assembly according to claim 4, wherein said grip has a central member extending between a pair of outward members, each of said outward members being spaced apart from each other and being oriented perpendicular with said central member, each of said outward members being coupled to said front surface of said door having said central member being spaced from said front surface.

6. The assembly according to claim 2, wherein said lifting unit comprises a biasing member having a lower end and an upper end, said lower being coupled to a top surface of said bottom end of said canister, said biasing member being biased to elongate such that said upper end travels toward said top end of said canister.

7. The assembly according to claim 6, wherein said lifting unit includes a plate having a lower surface and an upper surface, said lower surface being coupled to said upper end of said biasing member wherein said upper surface is configured to have the entrée dishes being stacked on said upper surface, said biasing member having a compressive strength being directly proportional to the number of entrée dishes being positioned on said plate wherein said biasing member is configured to position a topmost one of the entrée dishes adjacent to said top end of said canister regardless of the number of entrée dishes stacked on said plate.

8. The assembly according to claim 1, wherein said handle comprises a first member having a first end and a second end, said first member having a pair of bends each being integrated into said handle to define a central portion forming an angle with a pair of outward portions, each of said first end and said second end being associated with a respective one of said outward portions, each of said first end and said second end being coupled to said outer wall of said canister, each of said outward portions being oriented to angle upwardly on said canister having said central portion being horizontally oriented.

9. The assembly according to claim 8, wherein said handle includes a second member being coupled to and extending downwardly from said central portion, said second member having a distal end with respect to said central portion, said distal end being coupled to said outer wall.

10. A dish carrying assembly for carrying a plurality of entrée plates in a vertical stack, said assembly comprising:
   a cart having a plurality of rollers each being rotatably coupled to said cart wherein said plurality of rollers is configured to be rolled on a support surface, said cart having a top surface, a bottom surface and a perimeter surface extending between said top surface and said bottom surface, said perimeter surface being continuously arcuate such that said cart has a disk shape, each of said rollers comprising:
      a shock absorber having an upper end and a lower end, said upper end being coupled to said bottom surface of said cart, said shock absorber being compressible between said upper end and said lower end; and a wheel being rotatably disposed on said lower end of said shock absorber wherein said wheel is configured to roll along the support surface;

a canister being coupled to said cart having said canister extending upwardly from said cart, said canister having an entry extending into an interior of said canister wherein said entry is configured to facilitate entrée dishes to be positioned within said canister for transporting the entrée dishes, said canister having a bottom end, a top end and an outer wall extending between said top end and said bottom end, said bottom end resting on said top surface of said cart, said canister being elongated between said top end and said bottom end, said entry extending through said outer wall, said entry being elongated to extend substantially between said top end and said bottom end, said entry being positioned closer to said top end than said bottom end, said entry having a bounding edge, said bounding edge having an upper side and a lower side;

a pair of tracks, each of said tracks being integrated into said outer wall of said canister, each of said tracks being aligned with a respective one of said upper side and said lower side of said bounding edge of said entry;

a lifting unit being integrated into said canister wherein said lifting unit is configured to have the entrée dishes being stacked upon said lifting unit, said lifting unit being biased to travel upwardly in said canister wherein said lifting unit is configured to lift the entrée dishes upwardly thereby facilitating a user to remove a respective entrée dish from said canister without having to bend over, said lifting unit comprising:

a biasing member having a lower end and an upper end, said lower being coupled to a top surface of said bottom end of said canister, said biasing member being biased to elongate such that said upper end travels toward said top end of said canister; and a plate having a lower surface and an upper surface, said lower surface being coupled to said upper end of said biasing member wherein said upper surface is configured to have the entrée dishes being stacked on said upper surface, said biasing member having a compressive strength being directly proportional to the number of entrée dishes being positioned on said plate wherein said biasing member is configured to position a topmost one of the entrée dishes adjacent to said top end of said canister regardless of the number of entrée dishes stacked on said plate;

a door being slidably disposed on said canister, said door being slidable into a closed position having said door closing said entry, said door being slidable into an open position having said door exposing said entry, said door having an outer edge and a front surface, said outer edge having a first lateral side, a second lateral side, a top side and a bottom side, said front surface being convexly arcuate between said first lateral edge and said second lateral edge such that said door conforms to curvature of said outer wall of said canister, top side slidably engaging said track being aligned with said upper side of said bounding edge of said entry, said bottom side slidably engaging said track being aligned with said lower side of said bounding edge of said entry;

a grip being coupled to said door wherein said grip is configured to be gripped, said grip having a central member extending between a pair of outward members, each of said outward members being spaced apart from each other and being oriented perpendicular with said central member, each of said outward members being coupled to said front surface of said door having said central member being spaced from said front surface; and a handle being coupled to said canister wherein said handle is configured to be gripped for pushing said canister along the support surface, said handle comprising a first member having a first end and a second end, said first member having a pair of bends each being integrated into said handle to define a central portion forming an angle with a pair of outward portions, each of said first end and said second end being associated with a respective one of said outward portions, each of said first end and said second end being coupled to said outer wall of said canister, each of said outward portions being oriented to angle upwardly on said canister having said central portion being horizontally oriented, said handle including a second member being coupled to and extending downwardly from said central portion, said second member having a distal end with respect to said central portion, said distal end being coupled to said outer wall.

* * * * *